3,218,340
STEROID NITRITE ESTER AND
PROCESS THEREFOR
John S. Tadanier, Chicago, Ill., assignor to Abbott Laboratories, North Chicago, Ill., a corporation of Illinois
No Drawing. Filed June 27, 1962, Ser. No. 205,542
5 Claims. (Cl. 260—397.4)

The present invention relates to a new steroid; particularly, it is concerned with the nitrite ester of 6β-hydroxy-3α,5α-cycloandrostan-17-one and a process for preparing the same.

The 6β-hydroxy-3α,5α-cycloandrostan - 17-one nitrite ester is a new compound; it is of great importance as a stepping stone for the manufacture of a variety of known and new steroids. For example, the nitrite ester of 6β-hydroxy-3α,5α-cycloandrostan-17-one can be used in the process published by Barton et al. in J. Am. Chem. Soc. vol. 83, page 4076 (1961) for making 19-oxygenated steroids. The latter ones have established uses for preparing 19-nor-steroids and useful compounds of the estrane series. Certain 19-oxygenated steroids also closely resemble naturally occurring endocrine agents.

6β-hydroxy-3α,5α-cycloandrostan-17-one nitrite ester can be made from a number of known intermediates: for instance, by deamination of 6-amino-3α,5α-cycloandrostan-17-one wherein the amino group is in the α- or β-position, or from 3β-aminoandrost-5-en-17-one with sodium nitrite in dilute acetic acid.

In a simple embodiment, the nitrite ester of 6β-hydroxy-3α,5α-cycloandrostan-17-one is made by treating 6β-hydroxy-3α,5α-cycloandrostan-17-one with sodium nitrite in fairly concentrated aqueous acetic acid. In a modification of this procedure, the 6β-hydroxy-compound is esterified with nitrous chloride in pyridine.

To better illustrate the process of making the 6β-hydroxy-3α,5α-cycloandrostan-17-one nitrite ester, reference is made to the following examples which are intended to be illustrations only and are not meant to limit the invention since numerous modifications will be apparent to those skilled in the art.

Example 1

A solution of 804 mg. of 6β-hydroxy-3α,5α-cycloandrostan-17-one (described by Butenandt et al. in Berichte, vol. 75, page 591, of 1942) in 53 ml. of glacial acetic acid is placed in a reaction vessel. To this solution, a solution of 2.8 grams of sodium nitrite in 17.6 ml. of water is added and the resulting mixture is allowed to stand at room temperature for 15 minutes. The solution is then shaken with 200 ml. of ether and 500 ml. of water. The aqueous solution is separated and extracted with 200 ml. of ether. The ether solutions are washed in series with three 100-ml. portions of water, two 150-ml. portions of 5% sodium bicarbonate solution, and three 100-ml. portions of water. The ether solutions are then combined and dried over anhydrous magnesium sulfate. After evaporating the ether, 858 mg. of a clear, orange, viscous oil is obtained which is diluted with 10 ml. of ether and placed on a chromatographic column filled with 80 grams of neutral alumina of activity III. The column is eluted with ether/pentane (1:25). After stripping the solvent, 503 mg. of the nitrite ester of 6β-hydroxy-3α,5α-cycloandrostan-17-one is obtained as a pale-green oil which is identified by its infrared spectrum. Further elution of the column with ether yields 271 mg. of unreacted starting material.

Example 2

A solution prepared from 1.9 grams of the acetic acid salt of 6β-amino-3α,5α-cycloandrostan-17-one and 100 ml. of glacial acetic acid/water (1:3) is cooled to 8° C. and a freshly prepared solution of 8 grams of sodium nitrite in 100 ml. of glacial acetic acid/water (1:3) at 8° C. is added. The resulting solution is allowed to stand at room temperature for one hour during which time the solution becomes turbid and a white paste separates.

At the end of this deamination time, the reaction mixture is shaken with 100 ml. of water and 250 ml. of ether. The aqueous solution is separated and extracted with 200 ml. of ether and this solution is washed in series with three 100-ml. portions of water, four 100-ml. poritons of 5% sodium bicarbonate solution, and three 100-ml. portions of water. After combining the ether extracts, they are dried over anhydrous magnesium sulfate from which the solvent in stripped, leaving 1.53 grams of a clear, viscous, light-yellow oil. This product is diluted with 12 ml. of ether and placed on a chromatographic column containing 100 grams of neutral alumina of activity III. The column is eluted with ether/pentane (1:20), yielding 799 mg. of a pale-green oil which partially crystallizes on standing and is extremely soluble in pentane. For analysis, this material is eluted through a column of 80 grams of neutral alumina of activity III with ether/pentane (1:25) to yield 560.2 mg. of a pale-green oil identified as 6β-hydroxy-3α,5α-cycloandrostan-17-one nitrite ester. It has infrared absorption maxima at 1730 cm.$^{-1}$ and 1629 cm.$^{-1}$ (chloroform) and the following ultraviolet absorption maxima (with the corresponding molecular extinction coefficients): 383 mμ (41.3), 370 mμ (6.7), 358 mμ (57.1), 346 mμ (41.3), 336 mμ (28.2) and 229 mμ (1740) in cyclohexane. The analytical values found are 71.69% C, 8.36% H and 4.82% N, corresponding very closely to the calculated values for the above identified nitrite ester of empirical formula $C_{19}H_{27}NO_3$.

When, in the above example, 6β-amino-3α,5α-cycloandrostan-17-one is replaced by either 6α-amino-3α,5α-cycloandrostan-17-one or 3β-aminoandrost-5-en-17-one, substantially the same results are obtained, under otherwise identical conditions.

As will be seen from the above examples, starting materials of the formulas

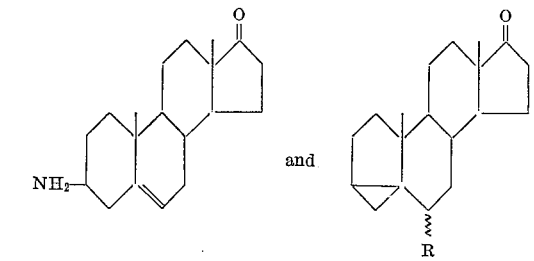

wherein R is an α-amino, β-amino or β-hydroxy, can be used for the preparation of the nitrite ester of 6β-hydroxy-3α,5α-cycloandrostan-17-one. In the case of using a starting material with an amino group, the deamination procedure is best carried out in aqueous acetic acid of a concentration between about 10% and 75%. When 6β-hydroxy-3α,5α-cycloandrostan-17-one is used as the starting material for the nitrosation reaction, an aqueous acetic acid within the higher range of the above concentration is preferred, e.g., of about 50–75%. Both reactions can be carried out at room temperature and are almost instantaneous at such a temperature, while when carried out at lower temperatures a somewhat longer reaction period is required. Excellent results are obtained when the process of the present invention is carried out at a temperature between 0° and 20° C. and is permitted to proceed within a period of 5 to 60 minutes. If temperature or time far exceed the foregoing limitations, some competing reactions may take place, which obviously would tend to decrease the yield of the desired 6-nitrite ester of 3α,5α-cycloandrostan-6-ol-17-one.

The amount of sodium nitrite used for the process of the present invention is not critical, as long as an excess of said nitrite is used. Obviously, other nitrite salts may be used in place of sodium nitrite but no particular reason is seen to substitute the customary sodium nitrite with potassium nitrite and the like.

Others may practice the invention in any of the numerous ways which will be apparent to one skilled in the art by the present disclosure. All such practice of the invention shall be considered a part hereof provided it falls within the scope of the appended claims.

I claim:
1. The nitrite ester of 6β-hydroxy-3α,5α-cycloandrostan-17-one.
2. The process of making a steroid of the formula

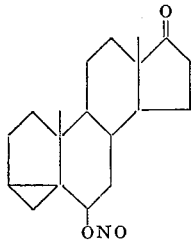

comprising the step of treating a starting material selected from the group consisting of

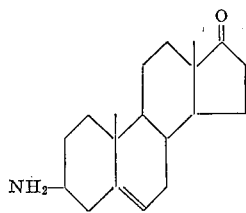 and 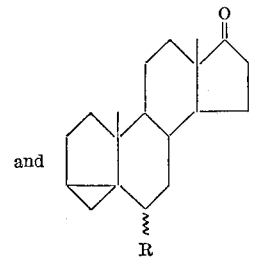

wherein R is selected from the group consisting of α-NH$_2$, βNH$_2$ and βOH with sodium nitrite in the presence of dilute, aqueous acetic acid for a period between 5 and 60 minutes at a temperature below 20° C.

3. The process of claim 2 wherein said starting material is

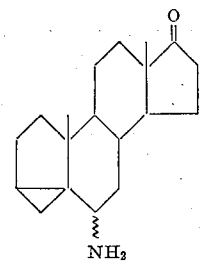

4. The process of claim 3 wherein said dilute acetic acid is of a concentration between 10% and 75%.

5. The process of claim 2 wherein said starting material is 6β-hydroxy-3α,5αcylcloandrostan-17-one, said dilute aqueous acetic acid is of a concentration between 50% and 75%, and said treatment is continued for a period between 5 and 15 minutes.

No references cited.

LEWIS GOTTS, *Primary Examiner.*

UNITED STATES PATENT OFFICE
CERTIFICATE OF CORRECTION

Patent No. 3,218,340                        November 16, 1965

John S. Tadanier

It is hereby certified that error appears in the above numbered patent requiring correction and that the said Letters Patent should read as corrected below.

Column 2, line 37, for "(6.7)" read -- (61.7) --.

Signed and sealed this 6th day of September 1966.

(SEAL)
Attest:

ERNEST W. SWIDER                               EDWARD J. BRENNER
Attesting Officer                                      Commissioner of Patents